Figure 1:
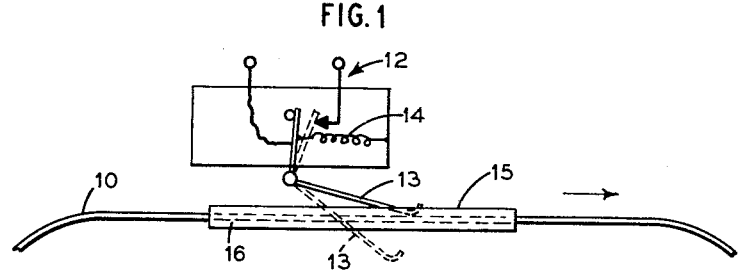

Dec. 18, 1962  J. ABADIE  3,069,570
TAPE CONTROL MEANS
Filed July 18, 1960  3 Sheets-Sheet 1

INVENTOR.
Jacques Abadie
BY
ATTORNEY

Dec. 18, 1962 J. ABADIE 3,069,570
TAPE CONTROL MEANS
Filed July 18, 1960 3 Sheets-Sheet 2

INVENTOR.
Jacques Abadie
BY
*Philip S. Hebert*
ATTORNEY

Dec. 18, 1962 J. ABADIE 3,069,570
TAPE CONTROL MEANS
Filed July 18, 1960 3 Sheets-Sheet 3

INVENTOR.
Jacques Abadie
BY
ATTORNEY

United States Patent Office 3,069,570
Patented Dec. 18, 1962

3,069,570
TAPE CONTROL MEANS
Jacques Abadie, 29 Ave. Paul-Adam, Paris 17, France
Filed July 18, 1960, Ser. No. 43,433
Claims priority, application France Oct. 22, 1959
6 Claims. (Cl. 307—115)

This invention relates to control means for electrically operated devices or systems, and more particularly, concerns control means of the perforated tape type which provides for cyclical or other sequence operations.

It has been proposed to use perforated tapes for the sequential operation of electric switches, to thereby control the operation of electrically operated devices in accordance with a predetermined program of operations. However, since the mechanical forces required to actuate the switches is substantial, the conventional tapes are quite thick and are made of materials resistant to the incident forces. Such thick tapes necessarily limit the use thereof, particularly when the tape must include a magnetic sound track for association with the control perforations.

Accordingly, one object of this invention is to provide means for utilizing relatively thin perforated control tapes which may include associated magnetic sound tracks.

With perforated tapes, control of the electrically operated mechanisms or systems, is attained by determined spacing of the successive perforations, length of the perforations and the rate of speed at which the tape is moved in relation to the control switch which is actuated between make and break positions by the successive perforated and imperforated portions of the moving tape. The tape may be moved at a constant speed, as by a synchronous motor for operating the tape transport means, or may be moved at a speed governed by the operation of the device being controlled.

When the tape is in endless form, cyclical control is effected in respect to the devices or systems being controlled. It is vital that the movement of the tape be synchronized with the operation of the device being controlled. Inasmuch as various switches, relays and the like, may intervene between the tape and the controlled device, a condition of asynchronism may arise, which must be corrected to insure synchronous operation.

Accordingly, another object of this invention is to provide in a perforated tape, means for periodically synchronizing the operation of the tape in relation to the operation of the controlled device or system.

A further object of this invention is to provide improved synchronizing means for a perforated control tape wherein the synchronizing means may be effective at the end of each cycle of operation; at successive intermediate points within a cycle of operation; or at any desired point in a given sequence operation.

Still another object of this invention is to provide improved means associated with perforated control tapes for effecting periodic synchronization of the tape with the operation of the controlled device; such means being applicable to conventional control tapes and utilizing a minimum number of supplemental components.

Yet another object of this invention is to provide in a perforated control tape having one or more sound tracks associated therewith, improved means for synchronizing the switch actuating perforations and the sound track, with the operation of the controlled device.

Other objects of this invention will in part be obvious and in part hereinafter pointed out.

Figure 2:
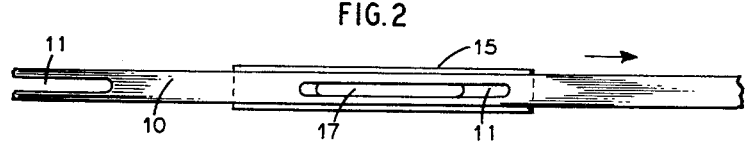
Figure 3:
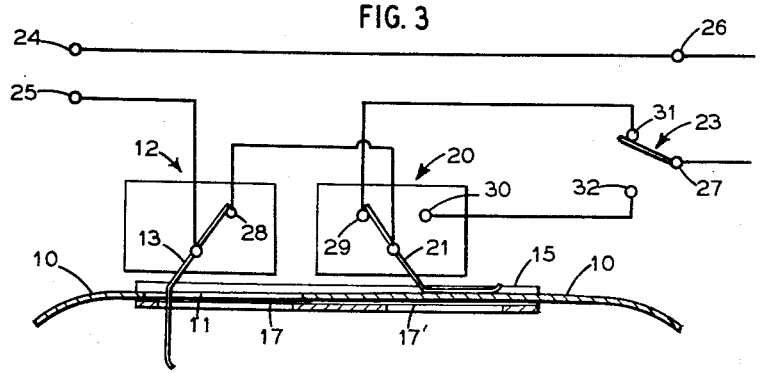
Figure 5:
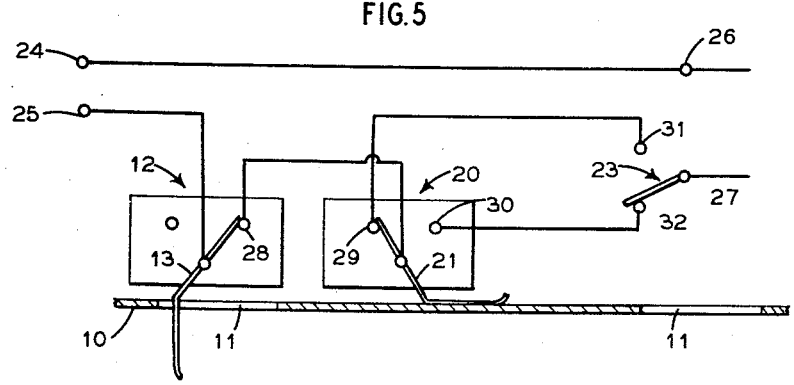
Figure 4:
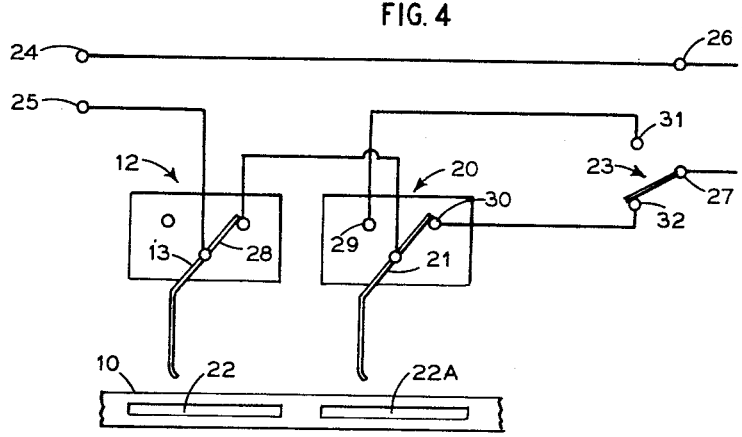
Figure 7:
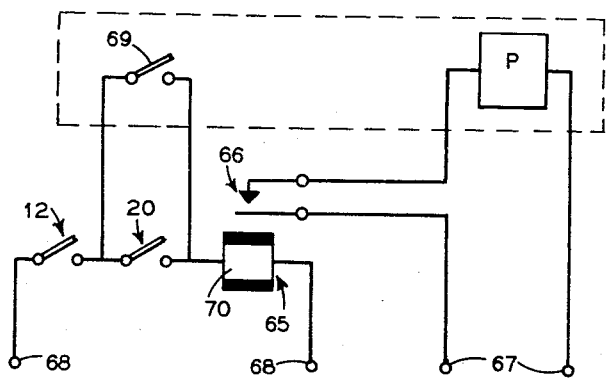
Figure 7A:
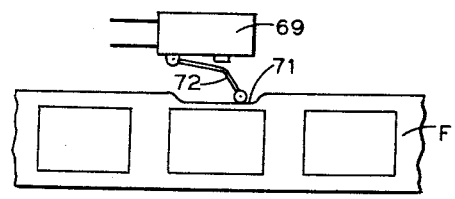
Figure 6:
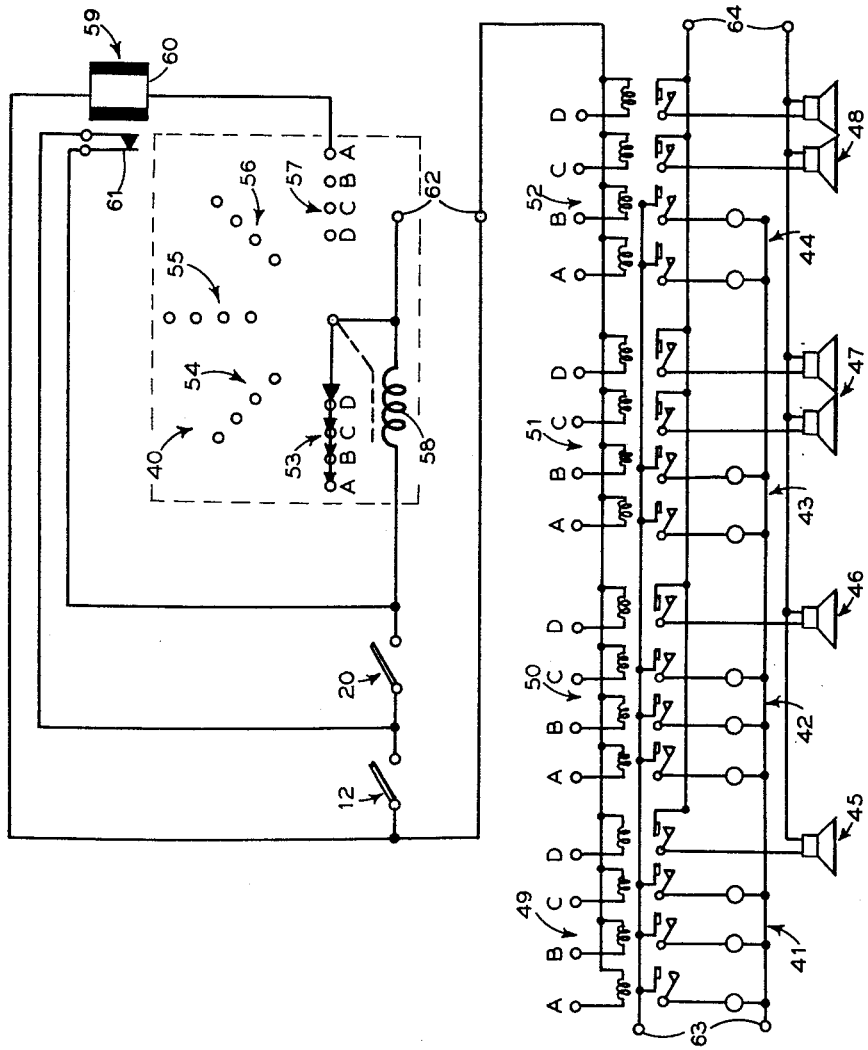

In the drawings, FIG. 1 is a side elevational view showing a perforated tape guide embodying the invention; FIG. 2 is a top plan view thereof; FIG. 3 is a diagrammatic showing of the synchronizing system embodying the invention; FIG. 4 is a view showing the system in a synchronized condition; FIG. 5 is a view showing the system in an asychronized condition; FIG. 6 is a schematic showing of an application of said synchronizing system; FIG. 7 is a schematic showing of another application thereof; and FIG. 7A is a schematic showing of a control portion of the system shown in FIG. 7.

In accordance with the invention, as shown in FIGS. 1, 2, there is provided a control tape 10 having longitudinally spaced perforations at determined intervals in the form of elongated slots 11. Tape 10 is adapted to be transported by suitable means, not shown, such as a synchronous motor which operates tape pulling means, not shown, all in a manner known in the art.

Tape 10 operates a micro-switch 12 having the usual actuating arm 13 biased by a spring 14. Tape 10 passes over a channeled support member 15 having a bottom wall 16 formed with a longitudinally extending slot 17. It will be apparent that when a tape slot 11 coincides with wall slot 17, arm 13 will drop through the registering slots to actuate the switch 12; the arm 13 in its dropped position being indicated in dotted lines.

When imperforate portions of tape 10 pass under arm 13, the same is raised to a position indicated in solid lines, to open switch 12. Support member 15 allows tape 10 to be formed of thin material and the tape may include one or more sound tracks not shown, appropriately located longitudinally of the tape and laterally related to slots 11.

It is understood that the length of slots 11 and their spacing, is determined by the programming of the device, not shown, whose operation is controlled by tape 10. Thus, switch 12 is connected in an appropriate electrical circuit, not shown, which may include relays, stepper switches or the like, for operating the controlled device in accordance with the selected program.

In effect, each time tape slot 11 registers with wall slot 17, switch 12 pulses the circuit including the same, to produce a determined operation of the controlled device or system. However, if for any reason, the controlled device gets out of step with the tape 10, a condition of asynchronism arises which must be corrected to provide proper synchronized operations.

Accordingly, as shown in FIGS. 3–5, there is provided means for automatically sensing synchronous or asynchronous conditions at a determined point in the travel of the tape 10, and for correcting an asynchronous condition. The determined point may be at the end of a cycle, as when the tape 10 is in endless form for cycle control; or may be at any predetermined point in the travel of the tape or at successive intervals therein.

To this end, the operational micro-switch 12 has associated therewith a synchronizing two-position micro-switch 20 connected in series therewith. Switches 12 and 20 are mounted in a fixed longitudinally spaced relation, above tape support 15 which is provided with a second slot 17′ spaced from slot 17, to receive actuating arm 21 of switch 20 when the same drops.

At a predetermined point in tape 10, as at the end of a cycle in case of an endless tape, there is provided a pair of slots 22, 22A at a fixed spacing corresponding to the spacing of wall slots 17, 17′ and switch arms 13, 21. Furthermore, there is provided a two-position switch 23 which is shifted to its alternative positions in accordance with the operation of the device being controlled, not shown.

In normal operation of the system, as shown in FIG. 3, input current for the control system is supplied at terminals 24, 25. The output of the control system at terminals 26, 27 is supplied to the controlled device, not shown, which may take the form of a stepper switch, relay or other electrically operated device.

Switches 12, 20 are connected between input terminal 25 and switch 23. Terminal 25 is connected to switch arm 13 of switch 12 whose contact 28 is connected to arm 21 of switch 20. Contacts 29, 30 of switch 20 are connected to the respective contacts 31, 32 of switch 23.

As shown in FIG. 3, switch 23 is in its normal operating position, wherein current may travel from terminal 25 through switch 12 when arm 13 is in its dropped position due to coincidence of a tape slot 11 with wall slot 17, while arm 21 is in its raised position over an imperforate portion of tape 10, thereby placing switches 12, 20 in series connection with output terminal 27 on switch 23. In this case, tape slots 13 are operative to pulse the control circuit.

When tape 10 has reached the end of its normal control cycle, or a predetermined point in its travel, as defined by tape slots 22, 22A, then both switch arms 13, 21 will drop through said tape slots, thereby shifting switch arm 21 to switch contact 30. At this moment, if the device being controlled, is in step with tape 10, then switch 23 will be shifted to contact 32 and the circuit between terminals 24, 25 and terminals 26, 27 will be completed and the system will continue in its synchronized operation.

However, if for any reason, the controlled device is not in step with tape 10, then an asynchronous condition is indicated as shown in FIG. 5. Here, switch 23 has been thrown to contact 32, but at that moment, tape slots 22, 22A are not coincident with wall slots 17, 17' and accordingly, while switch arm 13 may be in a dropped position, switch arm 21 is in its raised position over an imperforate portion of tape 10.

Accordingly, the circuit to terminals 26, 27 is broken and the controlled device will be deenergized until tape 10 has moved to locate slots 22, 22A in a position allowing both switch arms 13, 21 to drop and thus establish the condition shown in FIG. 4, to reestablish the circuit and to energize the controlled device.

It is understood that as soon as tape 10 has continued its movement, normal operation of the tape with its operating slots 11 is resumed, as switch 23 has now reassumed its normal operating position as indicated in FIG. 3.

For the purpose of illustration, in FIG. 6 is shown a system including the synchronizing control above described. Here, a system of coordinated audio and lighting devices are controlled through a stepper switch 40 for sequential operation of the same. Thus, electric lighting sections 41, 42, 43 and 44; and audio speaker devices 45, 46, 47 and 48 associated therewith, are operated in accordance with a program sequence governed by said stepper switch 40. Relay sets 49, 50, 51 and 52 respectively connect the successive steps of switch 40 to the audio-lighting combinations 41, 45; 42, 46; 43, 47 and 44, 48. The successive steps of switch 40 are indicated by contact banks 53, 54, 55 and 56. At contact bank 57, the stepper switch 40 recycles to repeat the pattern. The coordinated contacts of the contact banks and the individual relays of the relay sets 49, 50, 51 and 52 which are respectively interconnected by circuit means, not shown, are indicated by the letters A, B, C and D.

Micro-switches 12, 20 are arranged for actuation by control tape 10, in the manner previously described, and are also connected in series with solenoid winding 58 of stepper switch 40. A cycle relay 59 has its winding 60 in circuit with contact bank 57 and current supply 62. Normally closed contacts 61 of relay 59 are connected across synchronizing switch 20.

Control, current at terminals 62 is pulsed by switch 12 to step switch 40 through its successive positions. Relays 49–52 are respectively energized to energize the corresponding audio-lighting combinations from current supplies 63, 64.

When a cycle has been completed, switch 40 is pulsed to its recycle position at contact bank 57 and current is supplied to relay winding 60 to open contacts 61. At this point, tape 10 should have its synchronizing slots 22, 22A in a position to close both switches 12, 20, allowing winding 58 to be energized to step switch 40 to its next cycle.

If tape slots 22, 22A are not in the indicated position, switch 20 remains open and winding 58 is deenergized, leaving relays 49–52 in open circuit until tape 10 has moved to bring slots 22, 22A to a position for actuating switches 12, 20, thereby reenergizing coil 58 and starting the operation of stepper switch 40 anew.

In FIG. 7 is shown another system including the control means of the instant invention. Here a film projector P is controlled in its operation by a relay 65 whose contacts 66 are in circuit with the current supply 67 to projector P for moving film F therethrough by means, not shown. Control current is supplied from terminals 68, through micro-switch 12 and a normally closed control switch 69, to solenoid winding 70 of relay 65.

Each time switch 12 is operated by tape 10 through its slots 11, as previously described, relay 65 is pulsed to operate the film or slide advancing means in projector P. Tape 10 may also include a sound track which may be coordinated to the content of the films or slides in projector P, said tape having its sound track passing through a pick-up, not shown, for reproducing the sound.

As shown in FIG. 7A, film F used in projector P is formed on one edge with a synchronizing indentation 71 at a particular point in the length thereof. When film F reaches a position wherein indentation 71 is operative to actuate control switch 69 through its arm 72, then switch 69 is opened. At this time, if tape 10 is in synchronized relation to the operation of projector P, synchronization slots 22, 22A will be effective to close both switches 12, 20 to continue the energization of relay 65.

However, if there is a condition of asynchronization, switch 20 will remain open and with control switch 69 open, relay winding 70 will be deenergized and remain so until tape slots 22, 22A actuate switches 12, 20 to bring the operation of projector P in step with the tape 10. It will be apparent that in this case, the sound track on tape 10 will also be synchronized with the operation of projector P.

In the systems shown in FIGS. 6, 7, the means for transporting tape 10, such as a synchronous motor, or the like, is not shown, for purpose of simplicity of illustration. While tape 10 may be transported at a constant speed, it is understood that said tape may be moved at speeds coordinated with the operation of the device under control. Further, the switching means operable in response to the operation of the controlled device and coordinated with switches 12, 20, may take various forms dependent on the form of the controlled device.

It is understood that the control system of the instant invention has many applications, as for example: the automatic sequence operation of machine tools; automatic synchronization of audio-visual systems; distribution of audio signals among several loudspeaker units; announcing systems for transportation systems; and multi-sound track magnetic tapes in association with coordinated lighting effects; and the like.

It will be apparent that the perforated control tape disclosed herein may have various combinations of sound tracks and control slots arranged laterally of each other, as for example, longitudinally spaced slots in a medial portion of the tape and sound tracks on one or both sides of the slots. Also, a sound track may be located coincidentally with the control slots.

Furthermore, reading heads may be provided for reading the sound tracks on the moving control tape, to reproduce the signals therefrom, all in a manner known in the art.

As various changes might be made in the embodiments of the invention herein disclosed without departing from the spirit thereof, it is understood that all matter herein shown or described shall be deemed illustrative and not limiting except as set forth in the appended claims.

Having thus disclosed my invention, I claim as new and desire to protect by Letters Patent:

1. A control system for a sequentially operated electrical device comprising control switch means having an operating position and operable at a predetermined point in the operation of said device to a synchronizing position thereof, a pair of switch devices in spaced, fixed relation to each other, circuit means connecting said switch devices with said electrical device through said control switch means, a perforated control tape movable to control the sequential operation of said electrical device, said tape having longitudinally disposed slots at a predetermined spacing and cooperative with switch actuating portions of said switch devices for operating said switch devices, said tape further having a pair of synchronizing slots at a predetermined point therein with a spacing to allow for simultaneous operation of said pair of switch devices and to close said circuit means through said control switch means when said control switch means is in its synchronizing position.

2. A control system as in claim 1 wherein one of said pair of switch devices is an operational switch and the other of said pair of switch devices is a synchronizing switch, said synchronizing switch being normally open and said control switch means being normally closed, said synchronizing switch and said control switch means being connected in parallel.

3. A control system as in claim 1 wherein said control switch means is normally connected in series with one of said pair of switch devices, said control switch means being connected in series with both of said pair of switch devices at said predetermined point of operation of said electrical device.

4. A control system for a sequentially operated electrical device comprising control switch means movable between operating and synchronizing positions thereof at a predetermined point in the operation of said electrical device, circuit means for operating said electrical device including said control switch means in its operating position and a first switch device, a movable perforated tape having successive slots for periodically actuating said first switch device, a second switch device in series with said first switch device, said tape having a pair of synchronizing slots at a predetermined synchronization point therein for simultaneously actuating said first and second switch devices, said circuit means being closed upon operation of said first and second switch means only upon coincident operation of said control switch means to its synchronizing position.

5. A control system for a stepper switch having an operating winding, a pair of series connected micro-switches in circuit with said winding, a control relay having a pair of normally closed contacts in parallel connection with one of said micro-switches, said stepper switch having recycling contacts, said control relay having a winding in circuit with said recycling contacts and the other of said micro-switches, a movable perforated control tape for operating said micro-switches, said tape having a series of spaced slots for sequentially operating one of said micro-switches to periodically operate said stepper switch through its cycle, said tape having a pair of spaced synchronizing slots at a predetermined point in said tape for simultaneously actuating said pair of micro-switches, said stepper switch being operative at the end of its cycle of operation to energize the winding of said control relay, whereby coincident operation of said micro-switches with the operation of said control relay will energize the operating winding of said stepper switch.

6. A control system for a sequentially operated electrical device comprising control switch means in circuit with said device and having a normal operating position and being movable to a synchronizing position in response to operation of said electrical device at a predetermined point in its sequence of operations, a movable control tape, an operating switch in circuit with said electrical device and periodically operated by said tape for operating said electrical device, a synchronizing switch in circuit with said operating switch, circuit means connecting said control switch means, said operating switch and said synchronizing switch, said tape having means at a predetermined point therein corresponding to said predetermined point of operation of said electrical device for simultaneously actuating said operating and synchronizing switches, the actuated operating and synchronizing switches being operative to close said circuit means only with said control switch means in its synchronizing position.

References Cited in the file of this patent

UNITED STATES PATENTS

| | | |
|---|---|---|
| 2,475,439 | Walker | July 5, 1949 |
| 2,512,724 | Like | June 27, 1950 |
| 2,649,517 | Egan | Aug. 18, 1953 |
| 2,666,358 | Eash | Jan. 19, 1954 |
| 2,693,127 | Ortman | Nov. 2, 1954 |
| 2,844,811 | Burkhart | July 22, 1958 |
| 2,847,905 | Novak | Aug. 19, 1958 |
| 2,917,640 | Batterman et al. | Dec. 15, 1959 |
| 2,922,141 | Simmerman et al. | Jan. 19, 1960 |
| 2,993,408 | Cook | July 25, 1961 |
| 3,033,077 | Schwartz et al. | May 8, 1962 |

FOREIGN PATENTS

| | | |
|---|---|---|
| 68,591 | France | May 2, 1958 |

(Addition to No. 1,142,993)